Figure 3:
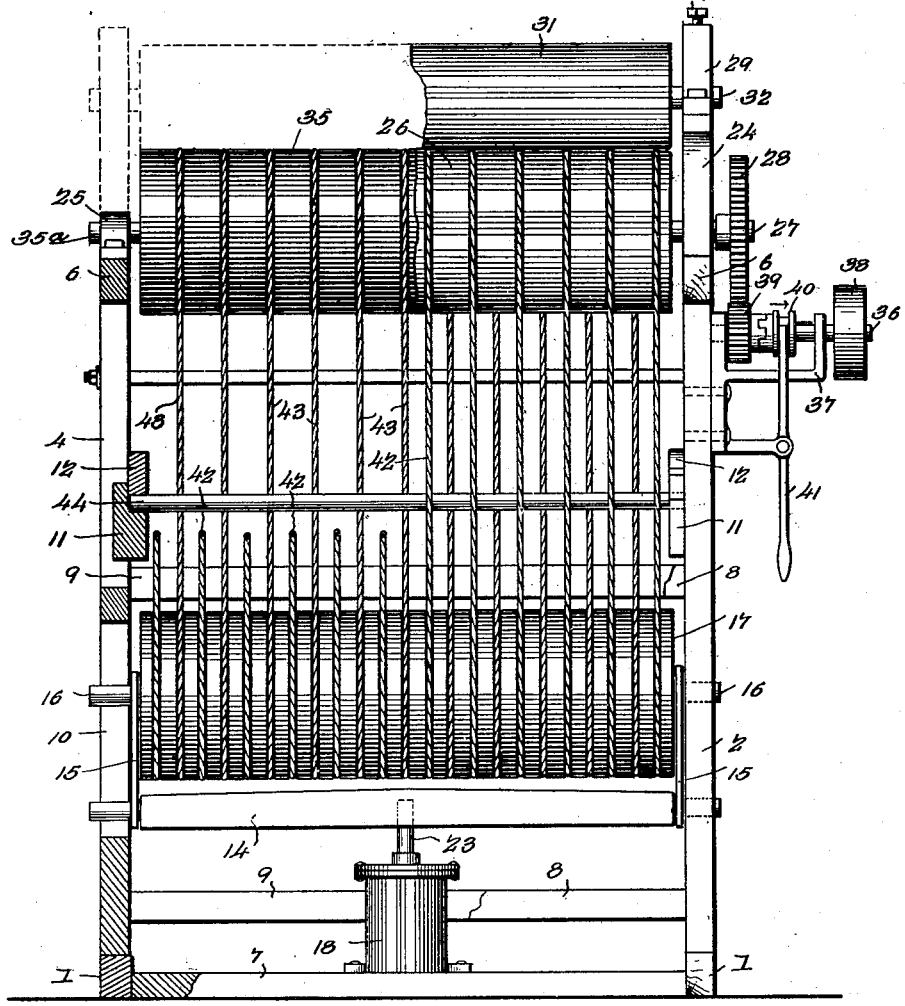

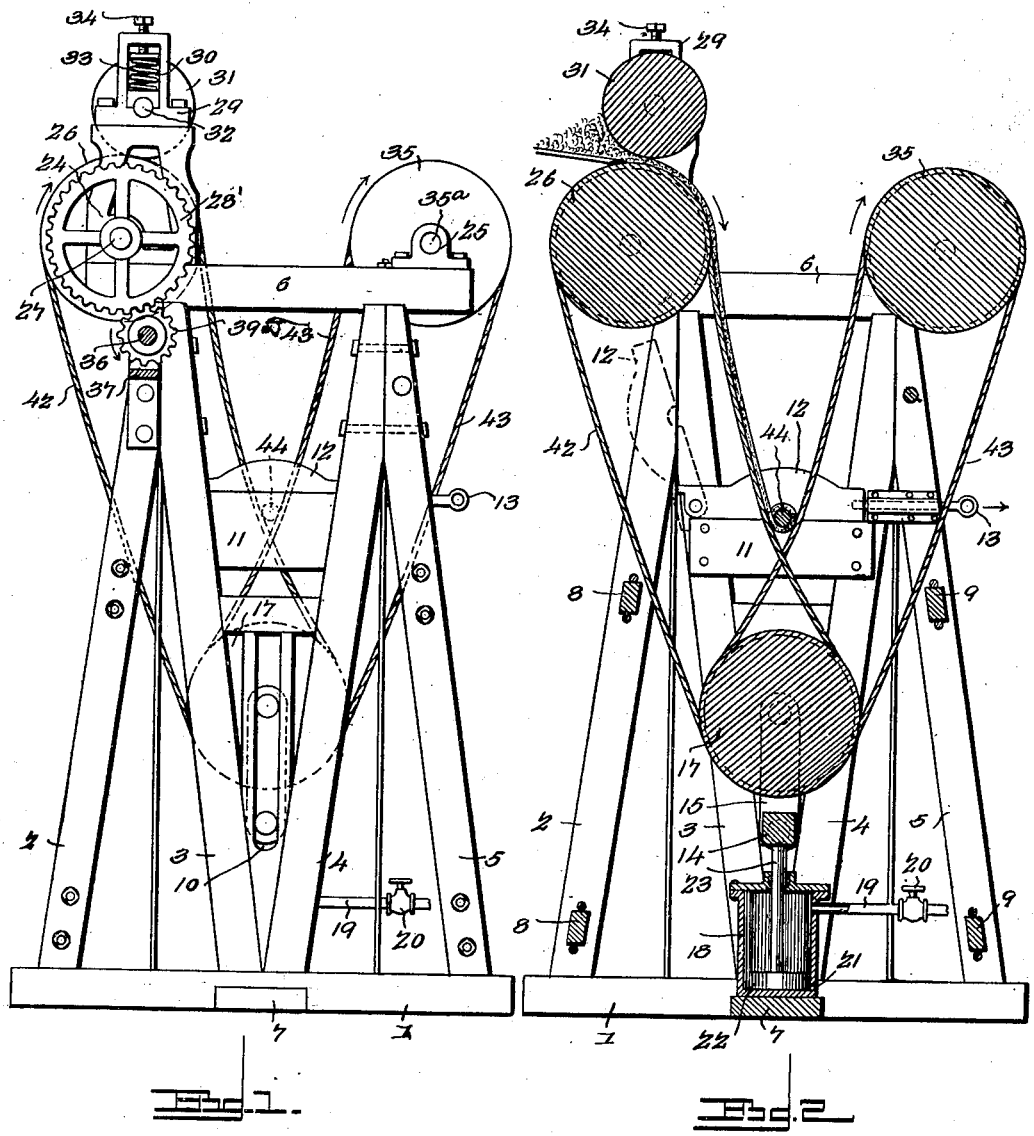

No. 660,243. Patented Oct. 23, 1900.
W. T. BESSONETTE.
COTTON PRESS.
(Application filed Jan. 11, 1900.)

(No Model.) 3 Sheets—Sheet 2.

Witnesses
E. K. Stewart
J. W. Garner

W. T. Bessonette, Inventor
By his Attorneys,
C. A. Snow & Co.

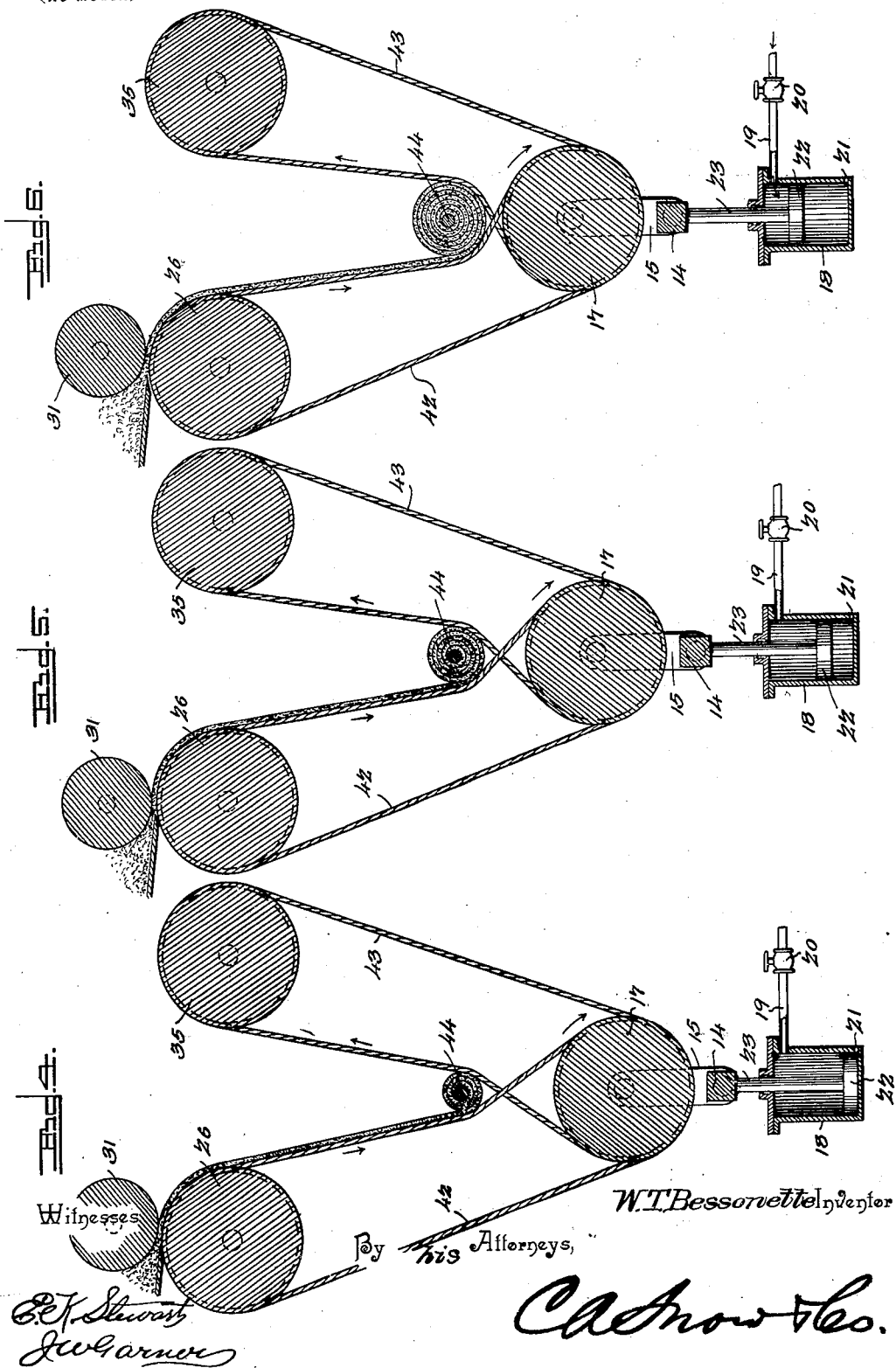

UNITED STATES PATENT OFFICE.

WILLIAM T. BESSONETTE, OF TEMPLE, TEXAS, ASSIGNOR OF FIVE-EIGHTHS TO W. A. BARCLAY, OF SAME PLACE.

COTTON-PRESS.

SPECIFICATION forming part of Letters Patent No. 660,243, dated October 23, 1900.

Application filed January 11, 1900. Serial No. 1,079. (No model.)

*To all whom it may concern:*

Be it known that I, WILLIAM T. BESSONETTE, a citizen of the United States, residing at Temple, in the county of Bell and State of Texas, have invented a new and useful Cotton-Press, of which the following is a specification.

My invention is an improved cotton-press of the type in which the cotton-bat from the gin and condenser is started upon a central core and rolled upon itself and compressed in a continuous sheet to form a cylindrical bale.

One object of my invention is to provide a cotton-press in which the rolled bale is of uniform density from core to circumference.

A further object of my invention is to provide a cotton-press in which the cotton-bat is rolled and compressed into bales by traveling cords and without the employment of compressing-rolls or other means for compressing the bales.

A further object of my invention is to provide a cotton-press of extreme simplicity, low cost, and high capacity in which the cotton-bat may be compressed into cylindrical bales of any required density.

To these ends my invention consists in the combination, with series of traveling compressing-cords, of a core-roller moving in unison with said cords.

My invention further consists in the combination, with two series of traveling compressing-cords moving in opposite directions, of a core-roller interposed between said series of traveling compressing-cords.

My invention further consists in the combination, with two series of endless traveling compressing-cords having their opposing sides, which travel in opposite directions, crossed or disposed in intersection-lines, of a core-roller located at the intersection of said series of endless traveling cords.

My invention further consists in the peculiar construction and combination of devices hereinafter fully set forth, and particularly pointed out in the claims.

In the accompanying drawings, Figure 1 is an elevation of a cotton-press embodying my improvements. Fig. 2 is a sectional view of the same. Fig. 3 is partly an elevation and partly a section of my improved cotton-press at right angles to Fig. 1. Fig. 4 is a diagrammatic sectional view illustrating the mode of operation of my improved cotton-press, the bale being in an initial stage of formation. Fig. 5 is a similar view, the bale being at an intermediate stage of formation. Fig. 6 is a similar view, the bale being at or near the final stage of formation.

In the embodiment of my improved cotton-press the construction of the framework thereof is as follows: On each of a pair of sills 1 are a series of inclined standards 2 3 4 5, which are arranged substantially in the form of the letter M and are bolted together at their upper ends in pairs, as shown, their lower ends being secured on the sills in any suitable manner. A pair of plates 6 are supported on and secured to the upper ends of said inclined standards, said plates, sills, and standards forming side frames which are connected together by a longitudinal beam 7, extending from one sill to the other at the centers thereof, and longitudinal beams 8 9, which connect the standards 2 and 5, respectively. Vertical ways 10 are constructed in the centers of the side frames between the standards 3 4, as shown, and said standards 3 4 are also connected together at a suitable point by bearings 11. Each of the said bearings is provided with a hinged upper section 12, adapted to be opened therefrom and swung to one side, as shown in Fig. 2, and locking-bolts 13 are provided, which are adapted to engage and lock the said hinged bearing-sections when the same are closed, as shown.

A cross-head 14 travels in the vertical ways 10 and carries movable bearings 15, in which are journaled the projecting ends of the shaft 16 of a follower sheave-roller 17, which is thus supported by the cross-head and the projecting ends of the shaft of which also travel in the ways 10.

Located under the center of the press is a steam-pressure cylinder 18, having a supply-pipe 19, which communicates therewith near the upper end thereof and is provided with a valve or steam-cock 20, and in one side of said cylinder, at or near the bottom thereof, is a small opening 21 for the admission of air to the lower end of said cylinder. A piston 22 in the cylinder has its rod 23 connected to the center of the cross-head.

Bearings 24 are located near one end of the plate 6, and bearings 25 are located near the opposite ends of said plates. A sheave-roller 26 has the projecting ends of its shaft 27 journaled in the bearings 24, the said shaft being provided at one end with a gear-wheel 28, which is keyed thereto. The bearings 24 have vertical extensions which support bearings 29, provided with vertical ways 30. A condenser-roll 31, which bears upon the sheave-roller 26, has its journals 32 in said bearings 29 and adapted to play in the ways 30, and tension-springs 33, which are located in said ways 30, bear upon the journals of said condenser-roller, and screws 34 are provided, which operate in threaded openings in the upper portion of the ways 30 and engage the upper ends of the tension-springs, the function of said screws being to regulate the tension of said springs, and hence cause the condenser-roll to bear upon the sheave-roller 26 with any desired degree of force. A sheave-roller 35 has its journals 35ᵃ in the bearings 25.

On a counter-shaft 36, which is journaled in a suitable bearing 37, secured to the press-frame, is keyed a power-pulley 38. A pinion 39, loose on said shaft, engages the spur-wheel 28 and is provided with a clutch 40, which is keyed on said counter-shaft and is provided with the usual lever 41, the function of said clutch and lever being to lock the said pinion to the counter-shaft and to unlock it therefrom, and hence rotate or discontinue the rotation of the sheave-roller 26.

A series of endless traveling compressing-cords 42 connect the actuating sheave-roller 26 and the follower sheave-roller 17 and are carried in matched grooves on said sheave-roller, and a similar series of endless traveling compressing-cords 43 connect the sheave-roller 35 with said follower sheave-roller 17 and are carried in similar matched grooves on said roller, the cords 43 being arranged alternately with the cords 42. It will be observed by reference to the drawings that the opposing inner sides of said series of endless traveling cords move in opposite directions and are crossed or disposed in intersecting lines. In practice these endless traveling compressing-cords will be wire ropes or cables of suitable size; but for the purposes of this specification they are herein designated as "cords."

Arranged between the inner opposing oppositely-moving sides of the two series of endless traveling compressing-cords, near the point of the intersection thereof, is a revoluble core-roller 44, which is adapted to be mounted in and unshipped or disengaged from the bearings 11 by means of the hinged upper sections 12 of said bearings and the locking-bolts 13. Said core-roller normally bears between and contacts with the opposing inner sides of the crossed series of endless traveling cords.

The operation of my improved cotton-press is as follows: The length of the piston-rod is such that when the piston bears upon the bottom of the cylinder, which is its normal initial position, the follower-roller 17 is supported in its movable bearings at such a height that the series of endless traveling compressing-cords will be slack and the weight of the follower sheave-roller will exert practically no tension upon said cords. This position of the follower sheave-roller and slack condition of said endless traveling compressing-cords is indicated at Fig. 1, and in this condition of the press the core-roller 44 is naked and is directly in contact with the opposing slack oppositely-moving sides of the series of endless traveling compressing-cords. Lint-cotton from the gin is condensed between the actuating sheave-roller 26 and the condenser-roll 31, said sheave-roller rotating in the direction indicated by the arrow in Fig. 1 and imparting motion to the series of endless traveling cords 42, through them to the follower sheave-roller 17, from the latter to the series of endless traveling cords 43 and their supporting sheave-roller 35, as will be understood, no intermediate gearing or other actuating mechanisms being employed between the said sheave-rollers. The bat from the condenser-roller by contacting with the downwardly-moving inner sides of the series of endless traveling compressing-cords 42 is carried by said cords to the core-roller 44, which is rotating in unison with the motion of said cords, and the bat when it reaches said roller is caused to be wound upon said roller to start the formation of a bale, as shown at Fig. 2, the bat being in contact with and actuated by the revolving core-roller and the oppositely-moving opposing inner sides of the traveling series of compressing-cords.

Heretofore in cotton-presses adapted to form bales of cotton from cotton-bat in a continuous sheet rolled upon itself in successive volute or spiral lines there has been a tendency to unduly compress the cotton-bat at the core, thus injuring the cotton and rendering it difficult or impossible to extricate the core-roller. My improved cotton-press obviates this difficulty and remedies this defect by subjecting the cotton-bat at the core, in the initial stage of the formation of the bale, only to the compression (which is comparatively slight) of the slack endless traveling compressing-cords and the core-roller interposed between them. As the formation of the bales proceeds, the slack of the endless compressing-cords is taken up at the diameter of the bale, and as the compressing-cords tighten they tend to lift the follower-roller, and the same is caused to exert initial tension upon the series of endless traveling compressing-cords, this stage of the formation of the bale being illustrated in Fig. 4 of the drawings.

As the formation of the bale continues and the diameter of the completed portion thereof continues to increase the weight of the follower sheave-roller will be borne by the bale and the piston will begin to move upward in the pressure-cylinder. This stage of the formation of the bale is illustrated in Fig. 5.

It will be understood from the foregoing description that from the initial operation of starting the formation of the bale to the stage in the formation thereof when the increasing pressure of the sides of the bale against the traveling compressing-cords causes the weight of the follower sheave-roller and its connections to be wholly borne by said bale the pressure or degree of compression between said compressing-cords and the core-roller on the cotton-bat will be gradually increased proportionately as the diameter of the bale enlarges, hence subjecting the bale to uniform pressure from core to circumference. As the diameter of the bale continues to enlarge after passing the stage wherein the weight of the follower sheave-roller and its connections is borne by the bale, downward pressure will be exerted on the piston in the cylinder by permitting the inflow of steam into the upper end of the pressure-cylinder, the pressure of the steam on the piston being regulated by the cock or valve and being caused to increase as the bale enlarges, and thereby correspondingly increasing the tension of the compressing-cords until the bale is completed.

When the bale is of the required size, the sheet of bat is cut, a piece of bagging is caused to be rolled around and envelop the bale, and the bale tied, as will be understood, the operation of the press being discontinued as soon as the bale is bagged, and after the bale has been tied the bearings 11 are opened, so as to release the core-roller, and the bale is then hoisted from the press by any suitable means.

Before the bale is removed from the press steam is cut off from the pressure-cylinder. It will be understood that as the piston travels upward in the pressure-cylinder during the formation of the bale air is sucked into the lower end of the pressure-cylinder behind the upwardly-moving piston through the air-opening in the pressure-cylinder, thereby forming a pneumatic cushion below the piston, which will prevent the piston and the follower sheave-roller from dropping suddenly when the completed bale is removed from the press, inasmuch as the air in the lower portion of the pressure-cylinder will have to be expelled therefrom by the piston as the latter descends, and hence the descent of the follower sheave-roller and its connections will be gradual and without jar or danger of injury to the press.

I do not desire to be limited to the precise construction and combination of devices herein shown and described, as it is obvious that modifications may be made therein without departing from the spirit of my invention.

Having thus described my invention, I claim—

1. A cotton-press having movable compressing-cords crossed or disposed in intersecting lines, and between which the bale is formed, substantially as described.

2. In a press, the series of endless traveling compressing-cords having their opposing plies between which the bale is formed traveling in opposite directions, crossed, or disposed in intersecting lines, substantially as described.

3. In a press, the combination, with the two series of endless traveling compressing-cords having their opposing sides, which travel in opposite directions, crossed, or disposed in intersecting lines, of the core-roller located at the intersection of said series of endless traveling cords, substantially as described.

4. The combination, with the series of endless traveling compressing-cords, having their opposing sides, which travel in opposite directions, crossed, or disposed in intersecting lines, of the sheave-rollers in fixed bearings for the upper portions of said series of endless traveling compressing-cords, and the follower sheave-roller, in movable bearings, for the lower portions of said series of endless traveling compressing-cords and common to both of said series of said cords, and the core-roller located at the point of intersection of the opposing sides of said series of cords, substantially as described.

5. In a press, the combination with the series of endless traveling compressing-cords having their opposing plies, which travel in opposite directions and between which the bale is formed, crossed, or disposed in intersecting lines, of means to regulate the tension of said cords, substantially as described.

6. The combination, in a cotton-press, of the series of traveling compressing-cords, having their opposing sides which move in opposite directions crossed or disposed in intersecting lines, the core-roller disposed between said oppositely-moving series of cords, and means to regulate the tension of said cords, substantially as described.

7. A cotton-press comprising sheave-rollers, a follower-roller and series of endless traveling compressing-cords whereby said sheave-rollers are each independently connected directly to said follower-roller, substantially as described.

8. The combination, in a cotton-press, of the pair of sheave-rollers, in fixed bearings, the follower sheave-roller in movable bearings, the two series of endless traveling cords on said rollers, and having their opposing inner sides crossed, or disposed in intersecting lines, the core-roller disposed between said series of compressing-cords, and means to move the follower-roller, and thereby regulate the tension of said endless compressing-cords, substantially as described.

9. In a cotton-press, the combination with the two series of crossed endless traveling compressing-cords, the follower sheave-roller therefor, and the pressure-cylinder having the piston connected to said follower sheave-roller, substantially as described.

10. In a cotton-press, the combination with the two series of crossed endless traveling compressing-cords, the follower sheave-roller therefor, the pressure-cylinder, having the piston connected to said follower sheave-roller, and the pressure-chamber or cushion for said piston, for the purpose set forth, substantially as described.

11. In a cotton-press, the combination with the two series of crossed endless traveling compressing-cords, of the follower sheave-roller, common to the cords of both series, the independent supporting sheave-rollers for said cords, and means to actuate one of said rollers, substantially as described.

12. In a cotton-press, the combination with the two series of crossed endless traveling compressing-cords of the follower-roller common to the cords of both series, the independent supporting sheave-rollers for said cords, a condenser-roll bearing on one of said supporting sheave-rollers, and means to actuate the latter, substantially as described.

13. A cotton-press, comprising a pair of sheave-rollers in fixed bearings, a follower-roller, series of endless traveling compressing-cords connecting said sheave-rollers and said follower-roller and means to vary the tension of said compressing-cords, substantially as described.

14. The combination, in a cotton-press, of the core-roller in non-movable bearings, the series of crossed endless traveling compressing-cords contacting with said core-roller, and the sheave-rollers for said endless traveling cords, and means to rotate one of said rollers, and thereby communicate motion to all of said sheave-rollers, said endless traveling cords and said core-roller, substantially as described.

15. In a cotton-press, the combination with the series of slack crossed endless traveling compressing-cords, the core-roller, disposed between the opposing sides of said traveling compressing-cords, and so arranged with reference thereto, that the bat, rolled upon said core-roller, by contact with said cords, will take up the slack of said cords as the diameter of its roll enlarges, for the purpose set forth, substantially as described.

16. A cotton-press having initially-slack movable carrier and compressing elements crossed or disposed in intersecting lines for contact with sides of a bale formed between said movable carrier and compressing elements, and capable of separation as the bale increases in size, and means to tighten and vary the tension of said carrier and compressing elements, substantially as described.

In testimony that I claim the foregoing as my own I have hereto affixed my signature in the presence of two witnesses.

WILLIAM T. BESSONETTE.

Witnesses:
JAMES PATON,
LEM. BURR.